(12) United States Patent
Lee et al.

(10) Patent No.: US 11,114,652 B2
(45) Date of Patent: Sep. 7, 2021

(54) METHOD FOR MANUFACTURING SECONDARY BATTERY ELECTRODE, AND SECONDARY BATTERY ELECTRODE MANUFACTURED THEREBY

(71) Applicant: LG Chem, Ltd., Seoul (KR)

(72) Inventors: Dae Won Lee, Chungcheongbuk-do (KR); Dong Hyeuk Park, Chungcheongbuk-do (KR); Ki Eun Sung, Sejong (KR); Jun Wan Kim, Gyeonggi-do (KR); Hyun Jin Jeon, Chungcheongbuk-do (KR); Jae Hong Kim, Chungcheongbuk-do (KR); Sang Wook Kim, Chungcheongbuk-do (KR); Hak Sik Lee, Chungcheongbuk-do (KR); Sung Chul Park, Chungcheongbuk-do (KR); Jeong Ki Kim, Daejeon (KR)

(73) Assignee: LG Chem, Ltd.

( * ) Notice: Subject to any disclaimer, the term of this patent is extended or adjusted under 35 U.S.C. 154(b) by 116 days.

(21) Appl. No.: 16/345,413

(22) PCT Filed: Feb. 9, 2018

(86) PCT No.: PCT/KR2018/001731
§ 371 (c)(1),
(2) Date: Apr. 26, 2019

(87) PCT Pub. No.: WO2018/169213
PCT Pub. Date: Sep. 20, 2018

(65) Prior Publication Data
US 2019/0267606 A1 Aug. 29, 2019

(30) Foreign Application Priority Data
Mar. 13, 2017 (KR) .................. 10-2017-0031057

(51) Int. Cl.
*H01M 4/04* (2006.01)
*H01M 4/139* (2010.01)
(Continued)

(52) U.S. Cl.
CPC .......... *H01M 4/0433* (2013.01); *H01M 4/04* (2013.01); *H01M 4/13* (2013.01); *H01M 4/139* (2013.01);
(Continued)

(58) Field of Classification Search
CPC .... H01M 2/1016; H01M 4/04; H01M 4/0433; H01M 4/13; H01M 4/139; H01M 10/0525; Y02T 10/70; Y02E 60/10; Y02P 70/50
See application file for complete search history.

(56) References Cited

U.S. PATENT DOCUMENTS

| 2012/0321946 A1 | 12/2012 | Kim | |
| 2015/0086842 A1* | 3/2015 | Kang | H01M 2/021 429/156 |
| 2017/0110713 A1 | 4/2017 | Otsuka | |

FOREIGN PATENT DOCUMENTS

| JP | H09-219189 A | 8/1997 |
| JP | 2005-026158 | * 1/2005 |

(Continued)

OTHER PUBLICATIONS

Extended European Search Report including the Written Opinion for Application No. EP 18767738.0 dated Aug. 28, 2019, pp. 1-9.
(Continued)

*Primary Examiner* — Brittany L Raymond
(74) *Attorney, Agent, or Firm* — Lerner, David, Littenberg, Krumholz & Mentlik, LLP

(57) ABSTRACT

The present invention discloses a method of manufacturing an electrode for a secondary battery by using a single
(Continued)

process to notch and cut a unit electrode from an electrode sheet. The method for manufacturing electrodes for a secondary battery includes supplying an electrode sheet in a moving direction (MD), wherein the electrode sheet has a plurality of coated portions and uncoated portions alternately arranged along the MD, wherein each coated portion has an electrode active material, and each uncoated portion does not have an electrode active material; and cutting the uncoated portions to form the plurality of unit electrodes.

4 Claims, 4 Drawing Sheets

(51) Int. Cl.
  *H01M 10/0525* (2010.01)
  *H01M 4/13* (2010.01)
  *H01M 2/10* (2006.01)
  *H01M 50/20* (2021.01)

(52) U.S. Cl.
  CPC ....... *H01M 10/0525* (2013.01); *H01M 50/20* (2021.01); *Y02E 60/10* (2013.01); *Y02T 10/70* (2013.01)

(56) References Cited

FOREIGN PATENT DOCUMENTS

| | | |
|---|---|---|
| JP | 200526158 A | 1/2005 |
| JP | 2007-329050 A | 12/2007 |
| JP | 2008041404 A | 2/2008 |
| JP | 2011-034918 A | 2/2011 |
| JP | 2016219269 A | 12/2016 |
| KR | 20100136805 A | 12/2010 |
| KR | 2012-0076850 A | 7/2012 |
| KR | 20120139363 A | 12/2012 |
| KR | 2013-0091133 A | 8/2013 |
| KR | 20130102711 A | 9/2013 |
| KR | 20150025686 A | 3/2015 |
| KR | 101561445 B1 | 10/2015 |
| KR | 101647777 B1 | 8/2016 |
| KR | 101675950 B1 | 11/2016 |
| WO | 2013054593 A1 | 4/2013 |
| WO | 2016006420 A1 | 1/2016 |

OTHER PUBLICATIONS

Search Report from International Application PCT/KR2018/001731, dated Jun. 11, 2018.

* cited by examiner

METHOD FOR MANUFACTURING SECONDARY BATTERY ELECTRODE, AND SECONDARY BATTERY ELECTRODE MANUFACTURED THEREBY

CROSS-REFERENCE TO RELATED APPLICATION(S)

The present application is a national phase entry under 35 U.S.C. § 371 of International Application No. PCT/KR2018/001731, filed on Feb. 9, 2018, which claims priority to Korean Patent Application No. 10-2017-0031057, filed on Mar. 13, 2017, the disclosures of which are incorporated herein by reference.

TECHNICAL FIELD

The present disclosure relates to a method for manufacturing an electrode for a secondary battery, and more particularly, to a method for manufacturing a plurality of unit electrodes from a continuous electrode sheet, in which the plurality of unit electrodes are produced from a pattern coated material through a single process using a cutter or mold by improving an existing process in which the plurality of unit electrodes are produced from a supplied roll material through two processes of notching and cutting.

BACKGROUND ART

As the price of energy sources rises due to depletion of fossil fuels and the interest in environmental pollution increases, the demand for environmentally friendly alternative energy sources has become an indispensable factor for future life. In particular, as the technologies related to mobile devices are developed and the demand for the mobile devices increases, the demand for secondary batteries as an energy source is rapidly increasing.

Typically, in terms of the shape of the battery, there is a high demand for a rectangular secondary battery and a pouch-type secondary battery that can be applied to products such as mobile phones with a small thickness. In terms of material, there is a high demand for a lithium ion secondary battery such as lithium ion polymer battery having high energy density, discharge voltage, and output stability.

Generally, in order to manufacture a secondary battery, an active material is applied to the surface of a current collector to form a positive electrode and a negative electrode, and a separator is interposed therebetween to form an electrode assembly, then the electrode assembly is mounted at the inside of a cylindrical or rectangular metal or aluminum laminate sheet, and a liquid electrolyte is injected or coalesced into the electrode assembly or a solid electrolyte is used to manufacture the secondary battery.

Here, the electrode assembly is manufactured in various sizes according to the size and shape of the battery case and the capacity required in the related field. For this purpose, it is necessary to cut the electrodes and the separator forming the electrode assembly to a predetermined size.

The cutting process of the electrode and the separator includes the conventional process including two steps of notching and cutting after an electrode sheet roll material is supplied. However, after the notching process, it is rolled again and the notched roll is cut again to be laminated, and thus the process becomes long and complicated.

FIG. 1 is an exemplary view showing a process of manufacturing an electrode by line coating an electrode sheet according to the related art. In the line coating, an electrode active material is applied to a center portion of the electrode sheet to form a coated portion 2, and an uncoated portion 3 to which the electrode active material is not applied is formed at an edge portion of the sheet.

FIG. 2 is an exemplary view showing a method of manufacturing an electrode for a secondary battery according to the related art. In the related art, the electrode sheet coated by using the line coating is wound and supplied in a unit of a roll 1, and the uncoated portion 3 on a side surface of the roll 1 is processed through a notching process 4. In the notching process 4, a remaining portion of the uncoated portion 3 except for a portion of an aluminum or copper foil for connecting to the electrode is cut out using a mold having a shape of a unit electrode 6, and the process may be performed using a laser. The electrode sheet subjected to the notching process 4 is rewound, and the rewound electrode sheet is supplied to a cutting process 5. In the cutting process 5, the electrode sheet is cut into the unit electrode 6 using a cutter or laser.

In the process of winding the electrode sheet, a device or apparatus, such as a winder, a dancer, an edge positioning control (EPC) sensor, or the like, may be further included to move an electrode sheet roll. The device or apparatus is disposed to correct a moving direction of the electrode sheet, control a tension applied to the electrode sheet, or inspect a product. The EPC sensor is disposed for meandering correction of the electrode sheet, and monitors and corrects a position of the electrode sheet.

Further, as the process becomes longer and more complicated, there arises an economical problem that the manufacturing cost of the unit electrode is increased.

DISCLOSURE

Technical Problem

It is an object of the present invention to solve the problems of the prior art as described above. The present invention proposes a method of manufacturing an electrode for a secondary battery by introducing a single process in which the electrode sheet is wound in the longitudinal direction of the unit electrode to be produced and cut at a time in the shape of a unit electrode using a cutter or a mold.

Technical Solution

According to one exemplary embodiment of the present disclosure, there is provided a method for manufacturing a plurality of unit electrodes including: a first process of continuously supplying an electrode sheet on which a portion to which the electrode active material is applied ("a coated portion") and a portion to which the electrode active material is not applied ("an uncoated portion") are alternately arranged along a moving direction (MD) of the electrode sheet; and a second process of cutting the uncoated portion to form the plurality of unit electrodes. The electrode sheet can have one surface or both surfaces coated which the electrode active material.

In the first process, the electrode sheet may be supplied with a width equal to a width of the unit electrode to be manufactured.

In the second process, a mold or cutter having the same shape as a shape of the unit electrode may be pressed on the electrode sheet to process the electrode sheet into the unit electrodes.

The method for manufacturing an electrode for a secondary battery may further include a process of laminating the unit electrodes manufactured in the second process.

According to another exemplary embodiment of the present disclosure, there is provided an electrode for a secondary battery manufactured by the above-described method.

According to still another exemplary embodiment of the present disclosure, there is provided a secondary battery including the electrode.

The battery may be any one selected from lithium ion batteries, lithium polymer batteries, and lithium ion polymer batteries.

According to yet another exemplary embodiment of the present disclosure, there is provided a battery pack including at least one above-described secondary battery.

According to still yet another exemplary embodiment of the present disclosure there is provided a device including the battery pack as a power source.

The device may be any one selected from a mobile phone, a portable computer, a smartphone, a smart pad, a netbook, a wearable electronic device, a light electronic vehicle (LEV), an electric vehicle, a hybrid electric vehicle, a plug-in hybrid electric vehicle, and a power storage device.

Advantageous Effects

According to the present disclosure, there is provided a method for manufacturing an electrode for a secondary battery, in which an electrode sheet having a width equal to a width of a unit electrode to be manufactured is wound in a longitudinal direction of the unit electrode and supplied, and a single process of cutting out the supplied electrode sheet at a time in a shape of the unit electrode using a cutter or mold is introduced. The method for manufacturing an electrode for a secondary battery includes: a first process of continuously supplying an electrode sheet on which a portion to which the electrode active material is applied ("a coated portion") and a portion to which the electrode active material is not applied ("an uncoated portion") are alternately arranged along a moving direction (MD direction) of the electrode sheet; and a second process of cutting the uncoated portion to form the plurality of unit electrodes.

Further, the present disclosure provides: an electrode for a secondary battery which is manufactured by the above-described method; a secondary battery including the electrode; a battery pack using the secondary battery; and a device using the battery pack.

DETAILED DESCRIPTION OF THE PREFERRED EMBODIMENTS

Hereinafter, preferred embodiments of the present disclosure will be described in detail. Further, the present embodiments are not intended to limit the scope of the present disclosure, but are merely presented as an example, and various modifications are possible to the extent that technological gist is not deviated.

A method for manufacturing an electrode for a secondary battery according to the present disclosure is a method for manufacturing a plurality of unit electrodes from a continuous electrode sheet. The electrode sheet can have one surface or both surfaces coated with an electrode active material. The method includes: a first process of continuously supplying an electrode sheet on which a portion to which the electrode active material is applied ("a coated portion") and a portion to which the electrode active material is not applied ("an uncoated portion") are alternately arranged along a moving direction (MD direction) of the electrode sheet; and a second process of cutting the uncoated portion to form the plurality of unit electrodes.

The continuous electrode sheet having one surface or both surfaces on which the electrode active material is applied is manufactured by applying the electrode active material to a thin aluminum or copper plate, and a method of applying the electrode active material is divided into line coating and pattern coating. The line coating is a method in which a thin plate is continuously coated in a direction in which the thin plate is being moved, and the pattern coating is a method in which the thin plate is repeatedly coated in a direction perpendicular to the direction in which the thin plate is being moved.

Figure 1:
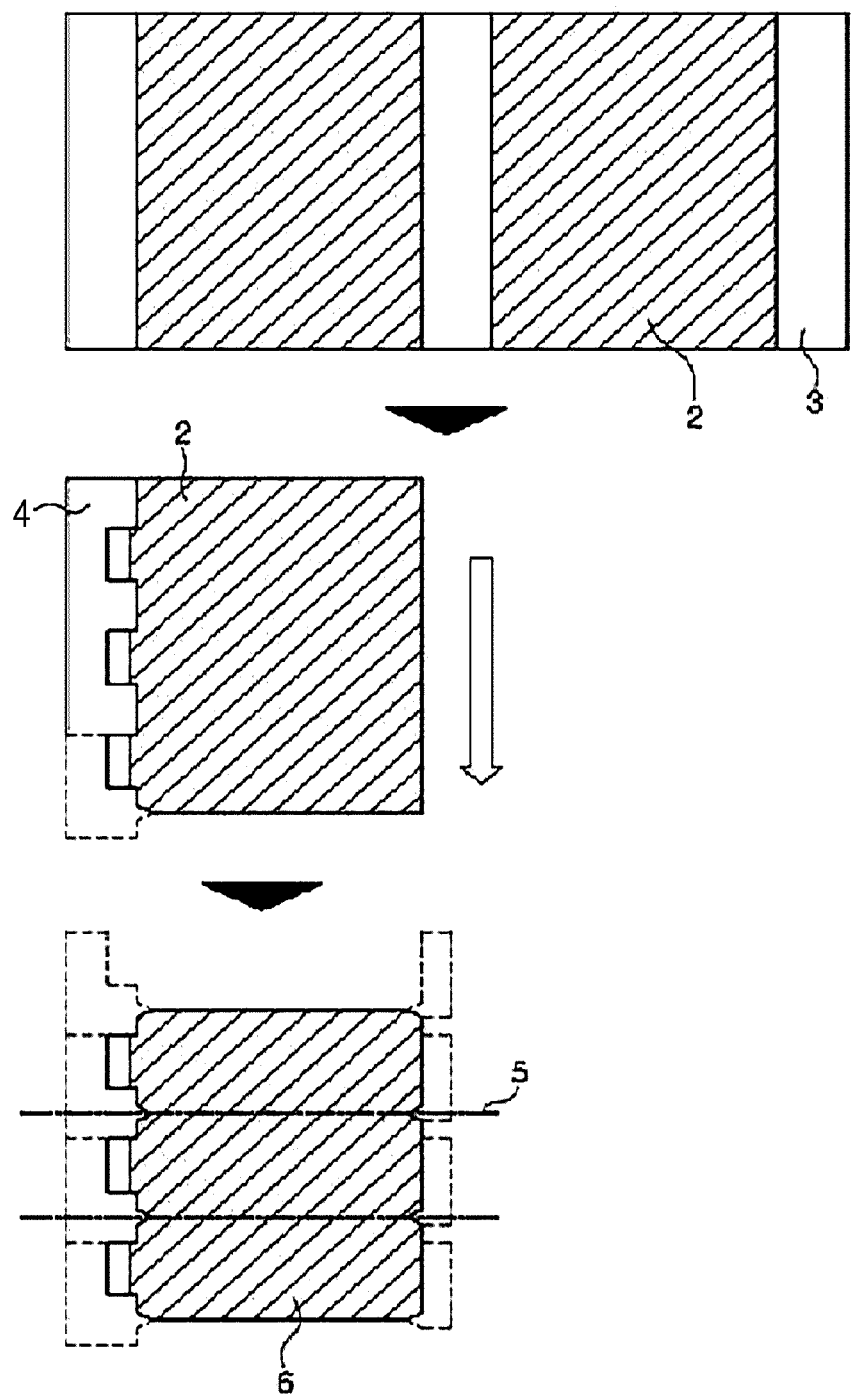
FIG. 1 is a cross-sectional view illustrating an electrode sheet coating process and an electrode manufacturing process according to the prior art
Figure 2:
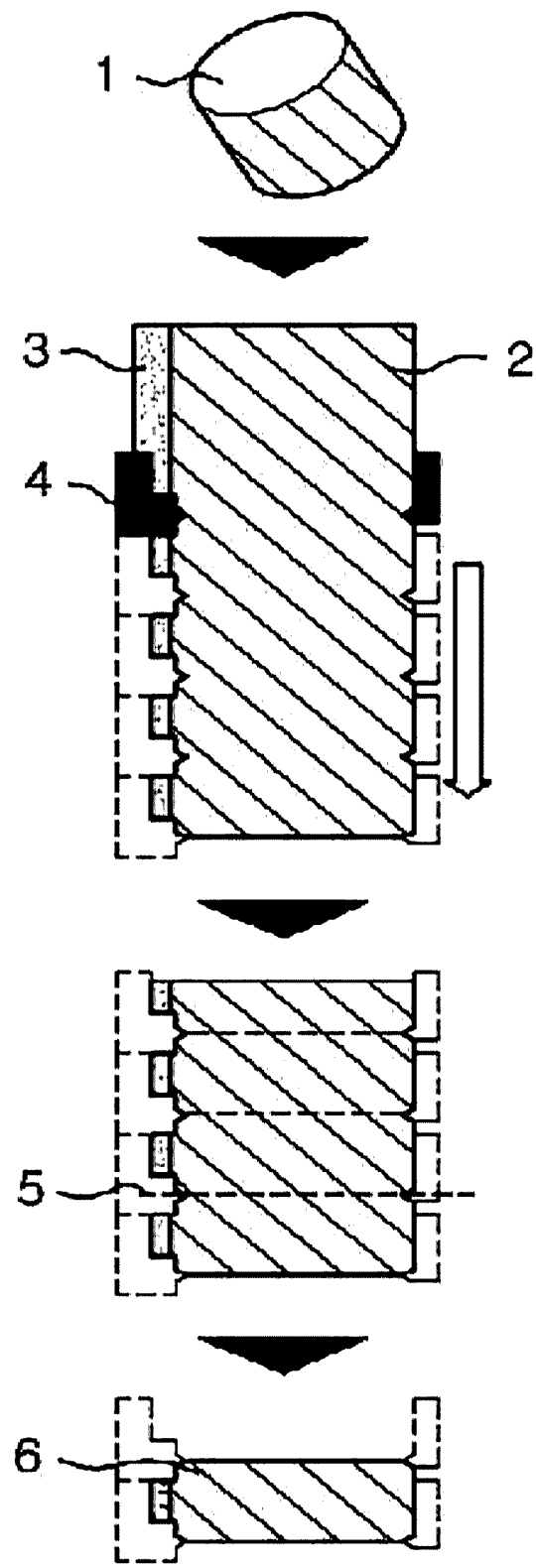
FIG. 2 is a view illustrating an example of a manufacturing process of an electrode for a secondary battery according to the prior art.
Figure 3:
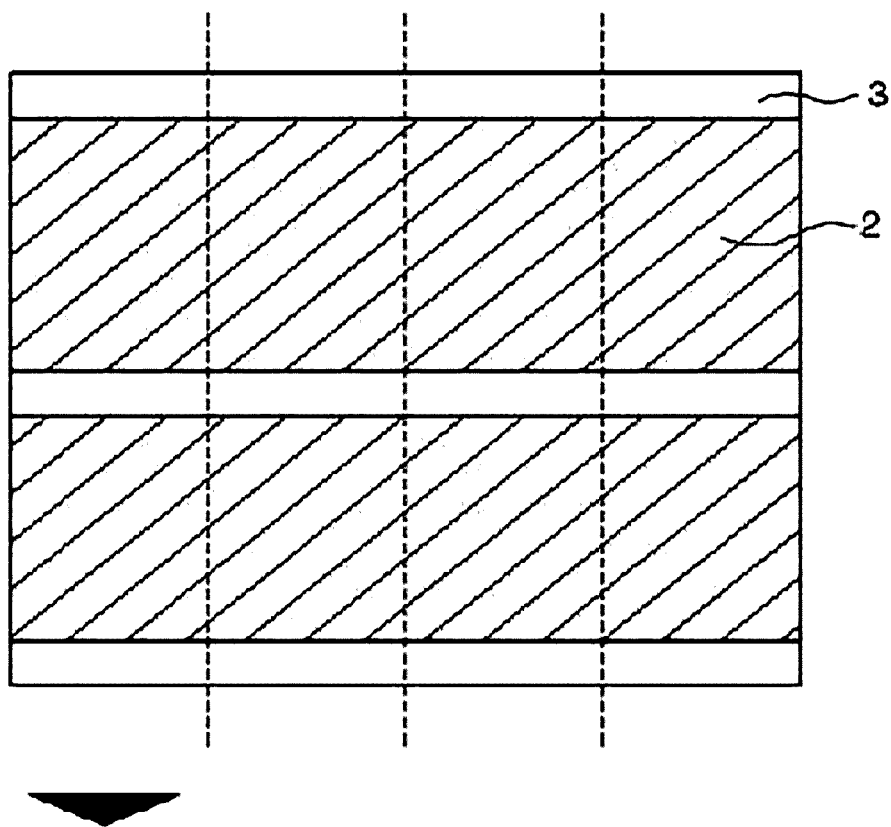
FIG. 3 is a cross-sectional view illustrating a process of coating an electrode sheet and manufacturing an electrode according to the present invention.
Figure 3:
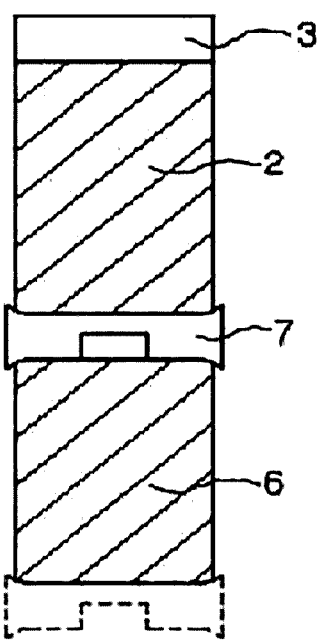

FIG. 3 is an exemplary view showing a process of manufacturing an electrode by pattern coating an electrode sheet according to the present disclosure. In the pattern coating, an electrode active material is applied to the entire electrode sheet along a moving direction of the electrode sheet and an uncoated portion 3 to which the electrode active material is not applied is alternately formed at regular intervals with a coated portion 2 to which the electrode active material is applied.

Figure 4:
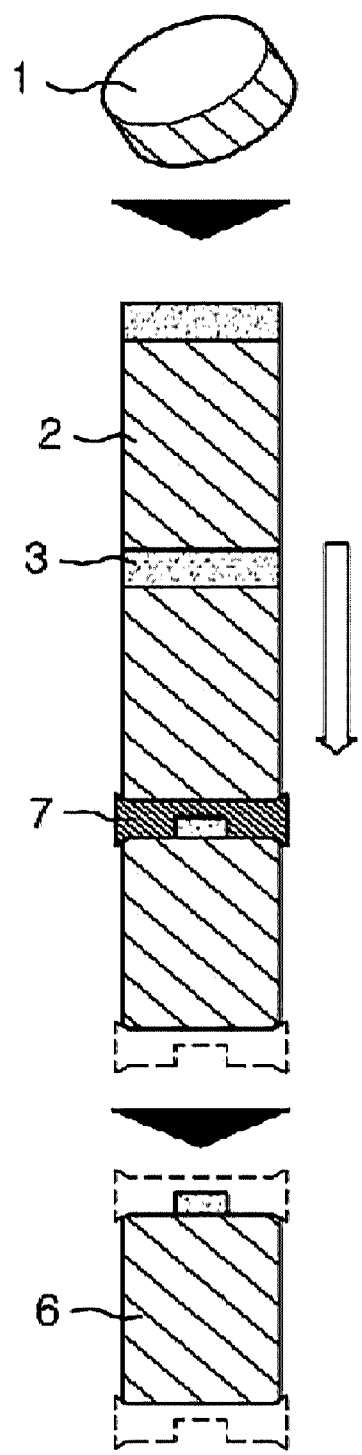
FIG. 4 is a view illustrating an example of a manufacturing process of an electrode for a secondary battery according to the present invention.

FIG. 4 is an exemplary view showing a method of manufacturing an electrode for a secondary battery according to the present disclosure. Unlike in the related art in which the unit electrode is manufactured through two processes of the notching process 4 and the cutting process 5, a roll-shaped electrode sheet is cut at one time while moving to manufacture a unit electrode 6 in the present disclosure.

A manufacturing process of the unit electrode 6 according to the present disclosure will be described as follows. An electrode sheet roll, in which a coated portion and an uncoated portion are alternately and regularly formed by using the pattern coating, is cut to a width of the unit electrode 6 in a state of being wound. A cut electrode sheet roll 1 is again unfolded and continuously supplied to a press having a mold 7 having the shape with a shape of an end portion of the unit electrode 6. An electrode sheet pressed by the mold 7 becomes the unit electrode 6. The manufactured unit electrode 6 may be immediately laminated, or solely used for assembling a secondary battery.

The unit electrode 6 has a shape in which a portion to be an electrode lead protrudes from a rectangular coated portion to which an electrode active is applied in a width direction and corner portions of the rectangular coated portion are rounded like being round processed, and thus, end portions of the unit electrode 6 have a concavo-convex shape in a portion to be the electrode lead, and have a shape of a straight-line having ends slightly bent in the other side. Therefore, the mold 7 having the same shape as the above-described shape must simultaneously press the concavo-convex shaped end portion of one unit electrode 6 and the straight-line shaped end portion of the unit electrode 6 to be manufactured subsequently. Accordingly, the mold 7 has an overall "T" shape and the middle portion thereof has a recessed portion with "[" shape. As depicted in FIG. 4, the mold 7 has a concave end and a convex end. The recessed portion is in the convex end and used to cut an electrical lead from the uncoated portions for each unit electrode 6. In operation, the concave end cuts a non-electrical lead end of one unit electrode, while the convex end cuts an electrical lead end of another unit electrode.

The electrode sheet roll 1 used in the present disclosure is pattern coated and has a structure in which a portion to which the electrode active material is applied and a portion to which the electrode active material is not applied are alternately arranged along the moving direction (MD direction) of the electrode sheet. When the pattern coated electrode sheet is continuously supplied, a cutter or the mold 7, which has the same shape as a shape corresponding to a connection portion of the unit electrode 6, punches and presses the electrode sheet placed on a die so that the electrode sheet is cut in the moving direction. The portion on which the cutter or the mold 7 presses corresponds to the uncoated portion 3 in the pattern coating, and the electrode sheet which is pressed and cut becomes the unit electrode 6 as it is, thereby simplifying the entire process.

Unlike in the related art, the cutter or the mold 7 used in the present disclosure has a shape which covers the connection portion of the unit electrode 6 in a "[" shape, and separates the electrode sheet into the unit electrode 6 in the moving direction and an electrode sheet not yet cut by one pressing operation.

In the related art, the notching or cutting is performed using a laser to precisely cut other adjacent unit electrodes to minimize damages thereof as much as possible, but resulting in great initial equipment costs and long process times. However, in the present disclosure, since the unit electrode is completely separated from the electrode sheet by one pressing operation, needs to precisely process the adjacent unit electrodes for minimized damage is reduced and precision processing using a laser is not required, and thus a process may be simplified and manufacturing cost of the unit electrode may be reduced.

In the method for manufacturing an electrode for a secondary battery according to the present disclosure, the electrode sheet is supplied with a width equal to a width of the unit electrode to be manufactured. By supplying the electrode sheet with the same width as the unit electrode, the unit electrode may be manufactured by only one pressing operation so that the laser is not required to be introduced and the process is simplified.

The method for manufacturing an electrode for a secondary battery according to the present disclosure may further include a process of laminating the manufactured unit electrode. To this end, a unit such as a lamination roller unit, a folding unit, a Z-folding unit, or the like, or a device for collecting the unit electrode may be further included.

The electrode for a secondary battery of the present disclosure manufactured by the above-described method can simplify the existing process which is performed by a notching process and a cutting process into a single process, thereby lowering unit cost of the product and simplifying equipment.

Meanwhile, the present disclosure provides a secondary battery including the electrode for a secondary battery manufactured by the above-described method.

The secondary battery according to the present disclosure is configured to accommodate an electrode assembly in which two electrodes of different polarities are laminated in a state of being separated by a separator, and the electrode assembly includes a positive electrode including a positive electrode active material, a negative electrode including a negative electrode active material, and a separator.

Specifically, the positive electrode is prepared, for example, by applying a mixture of a positive electrode active material, a conductive material, and a binder on a positive electrode current collector and then drying the resultant, and a filler may be further added to the mixture as necessary.

The positive electrode active material according to the present invention may be mixed with a layered compound such as lithium cobalt oxide ($LiCoO_2$), lithium nickel oxide ($LiNiO_2$), or a compound substituted with one or more transition metals; lithium manganese oxide ($LiMnO_2$) such as $Li_{1+x}Mn_{2-x}O_4$ (where x is 0 to 0.33), $LiMnO_3$, $LiMn_2O_3$ and $LiMnO_2$; lithium copper oxide ($Li_2CuO_2$); vanadium oxides such as $LiV_3O_8$, $LiFe_3O_4$, $V_2O_5$ and $Cu_2V_2O_7$; nickel-situ type lithium nickel oxide represented by the formula $LiNi_{1-x}M_xO_2$ (where M=Co, Mn, Al, Cu, Fe, Mg, B or Ga and x=0.01 to 0.3); lithium manganese complex oxide represented by the formula $LiMn_{2-x}M_xO_2$ where M=Co, Ni, Fe, Cr, Zn or Ta and x=0.01 to 0.1 or $Li_2Mn_3MO_8$ where M=Fe, Co, Ni, Cu or Zn; $LiMn_2O_4$ in which part of the lithium in the formula is replaced by an alkaline earth metal ion; disulfide compounds; and a compound containing a lithium intercalation material as a main component such as $Fe_2(MoO_4)_3$ or a composite oxide formed by a combination of these materials.

The positive electrode current collector generally has a thickness of 3 to 500 μm. Such a positive electrode collector is not particularly limited as long as it has high conductivity without causing a chemical change in the battery. For example, the positive electrode collector may be made of stainless steel, aluminum, nickel, titanium, sintered carbon or aluminum or stainless steel of which the surface has been treated with carbon, nickel, titanium, silver or the like. The current collector may form fine irregularities on the surface of the collector to increase the adhesive force of the positive electrode active material, and various forms such as a film, a sheet, a foil, a net, a porous body, a foam, and a nonwoven fabric are possible.

The conductive agent is usually added in the amount of 1 to 50 wt % on the basis of the total weight of the mixture containing the positive electrode active material. Such a conductive agent is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and summer black; conductive fibers such as carbon fiber and metal fiber; metal powders such as carbon fluoride, aluminum and nickel powder; conductive whiskey such as zinc oxide and potassium titanate; conductive oxides such as titanium oxide; and conductive materials such as polyphenylene derivatives, and the like.

The binder is an element that assists in bonding of the active material and the conductive material and bonding to the current collector, and is usually added in an amount of 1 to 50 wt % based on the total weight of the mixture containing the positive electrode active material. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for suppressing the expansion of the positive electrode, and is not particularly limited as long as it is a fibrous material without causing a chemical change in the battery. Examples of the filler include: olefin polymers such as polyethylene and polypropylene; and fibrous materials such as glass fibers and carbon fibers.

The negative electrode is manufactured by applying a negative electrode material onto the negative electrode collector and drying the negative electrode material. If necessary, the above-described components may further be included.

The negative electrode collector is generally made to have a thickness of 3 to 500 μm. The negative electrode current collector is not particularly limited as long as it has electrical conductivity without causing a chemical change in the battery. For example, the negative electrode current collector may be made of copper, stainless steel, aluminum, nickel, titanium, sintered carbon, copper or stainless steel of which the surface covered with carbon, nickel, titanium, silver or the like, an aluminum-cadmium alloy, or the like can. In addition, like the positive electrode collector, fine unevenness can be formed on the surface to enhance the bonding force of the negative electrode active material, and it can be used in various forms such as films, sheets, foils, nets, porous bodies, foams and nonwoven fabrics.

The negative electrode material includes amorphous carbon or regular carbon, and specifically, carbon such as hard graphitized carbon and graphite carbon; metal complex oxides such as $Li_xFe_2O_3(0 \leq x \leq 1)$, $Li_xWO_2(0 \leq x \leq 1)$, $Sn_xMe_{1-x}Me'_yO_z$ (Me: Mn, Fe, Pb, Ge; Me': Al, B, P, Si, Group 1, group 2, group 3 elements of the periodic table, halogen; $0 \leq x \leq 1$; $1 \leq y \leq 3$; $1 \leq z \leq 8$); lithium metal; lithium alloy; silicon-based alloys; tin-based alloys; oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; Li—Co—Ni-based materials and the like can be used.

A polyolefin-based separator commonly known as a separator for insulating the electrodes between the positive electrode and the negative electrode, or a composite separator having an organic and inorganic composite layer formed on the olefin-based substrate may be used without any particular limitation.

The electrolyte according to the present invention is a non-aqueous electrolyte containing a lithium salt, which is composed of a nonaqueous electrolyte and lithium. As the non-aqueous electrolyte, a non-aqueous electrolyte, a solid electrolyte, an inorganic solid electrolyte and the like are used.

Examples of the nonaqueous electrolyte include N-methyl-2-pyrrolidinone, propylene carbonate, ethylene carbonate, butylene carbonate, dimethyl carbonate, diethyl carbonate, gamma-butylo lactone, 1,2-dimethoxyethane, tetrahydroxy franc, 2-methyltetrahydrofuran, dimethylsulfoxide, 1,3-dioxolane, formamide, dimethylformamide, nitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ether, methyl pyrophosphate, ethyl propionate and the like (aprotic organic solvent).

Examples of the organic solid electrolyte include a polyethylene derivative, a polyethylene oxide derivative, a polypropylene oxide derivative, a phosphate ester polymer, an agitation lysine, a polyester sulfide, a polyvinyl alcohol, a polyvinylidene fluoride, a polymer including an ionic dissociation group, and the like.

Examples of the inorganic solid electrolyte include Li nitride such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, halides, sulfates and the like.

The lithium salt is a substance that is soluble in the non-aqueous electrolyte. For example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, $(CF_3SO_2)_2NLi$, chloroborane lithium, lower aliphatic carboxylate lithium, lithium 4-phenylborate, imide and the like can be used.

In order to improve charge/discharge characteristics and flame retardancy, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinones, N,N-substituted imidazolidine, ethylene glycol dialkyl ether, ammonium salt, pyrrole, 2-methoxyethanol, aluminum trichloride and the like can be added to the non-aqueous electrolyte. In some cases, a halogen-containing solvent such as carbon tetrachloride or ethylene trifluoride may be further added to impart nonflammability, or a carbon dioxide gas may be further added to improve high temperature storage characteristics.

The battery is any one selected from a lithium ion battery, a lithium polymer battery, and a lithium ion polymer battery. This is a classification according to the characteristics of the electrolytic solution, and the positive electrode and the negative electrode are the same as described above.

The present invention also provides a battery pack characterized by including at least one secondary battery.

A device including the battery pack as a power source can be provided, and the device may be one selected from a group consisting of a mobile phone, a portable computer, a smart phone, a smart pad, a netbook, a wearable electronic device, a LEV (Light Electronic Vehicle), an electric vehicle, a hybrid electric vehicle, a plug-in hybrid electric vehicle, and a power storage device.

While the present invention has been particularly shown and described with reference to exemplary embodiments thereof, it is to be understood that the invention is not limited to the disclosed exemplary embodiments, and various modifications and variations are possible within the scope of the claims.

| Description of Symbols | |
|---|---|
| 1: roll | 2: coated portion |
| 3: uncoated portion | 4: notching |
| 5: cutting | 6: unit electrode |
| 7: mold or cutter | |

The invention claimed is:
1. A method for manufacturing a plurality of unit electrodes, the method comprising:
   supplying an electrode sheet in a moving direction (MD), wherein the electrode sheet has a plurality of coated portions and a plurality of uncoated portions, wherein the coated portions and the uncoated portions are alternately arranged along the MD, wherein each coated portion has an electrode active material, and each uncoated portion does not have the electrode active material, and wherein the electrode active material is disposed on one or both surfaces of the electrode sheet; and cutting the uncoated portions to form the plurality of unit electrodes, wherein each unit electrode includes one coated portion, wherein the cutting of the uncoated portions comprises:

pressing a mold or cutter on a first uncoated portion of the plurality of uncoated portions, wherein the first uncoated portion separates a first coated portion and a second coated portion of the plurality of coated portions, wherein the mold or cutter has a first end and a second end that simultaneously cut the electrode sheet, wherein the second end includes a recess portion, wherein the first end cuts the electrode sheet such that the remaining electrode sheet under the first coated portion is flush with the first coated portion, and wherein the second end simultaneously cuts the electrode sheet such that a portion of the uncoated portion in the shape of the recess portion remains.

2. The method of claim 1, wherein a width of the electrode sheet is equal to a width of the unit electrode to be manufactured.

3. The method of claim 1, further comprising:

laminating the unit electrodes.

4. The method of claim 1, wherein the first end is a concave end, and wherein the second end is a convex end including the recess portion.

* * * * *